United States Patent
Kabe

(10) Patent No.: US 7,275,236 B1
(45) Date of Patent: Sep. 25, 2007

(54) METHOD FOR PROGRAMMING A MULTIPLE DEVICE CONTROL SYSTEM USING OBJECT SHARING

(75) Inventor: Akiyoshi Kabe, Nordrhein Westfalen (DE)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 410 days.

(21) Appl. No.: 09/936,160

(22) PCT Filed: Nov. 24, 2000

(86) PCT No.: PCT/JP00/08289

§ 371 (c)(1),
(2), (4) Date: Sep. 10, 2001

(87) PCT Pub. No.: WO02/42853

PCT Pub. Date: May 30, 2002

(51) Int. Cl.
*G06F 9/44* (2006.01)

(52) U.S. Cl. ..................... 717/106; 717/121

(58) Field of Classification Search ........ 717/120–122, 717/162, 103, 106; 700/2–4, 11, 20; 709/205, 709/248
See application file for complete search history.

(56) References Cited

U.S. PATENT DOCUMENTS

| | | | | |
|---|---|---|---|---|
| 5,079,695 A | * | 1/1992 | Dysart et al. | 719/316 |
| 5,453,933 A | * | 9/1995 | Wright et al. | 700/181 |
| 5,659,735 A | * | 8/1997 | Parrish et al. | 707/10 |
| 5,734,902 A | * | 3/1998 | Atkins et al. | 719/316 |
| 5,812,773 A | * | 9/1998 | Norin | 709/204 |
| 5,907,705 A | * | 5/1999 | Carter | 717/122 |
| 5,943,497 A | * | 8/1999 | Bohrer et al. | 717/121 |
| 6,067,477 A | * | 5/2000 | Wewalaarachchi et al. | 700/83 |
| 6,112,024 A | * | 8/2000 | Almond et al. | 717/122 |
| 6,173,438 B1 | * | 1/2001 | Kodosky et al. | 717/109 |
| 6,192,419 B1 | * | 2/2001 | Aditham et al. | 719/315 |
| 6,298,476 B1 | * | 10/2001 | Misheski et al. | 717/101 |
| 6,378,001 B1 | * | 4/2002 | Aditham et al. | 719/313 |
| 6,408,429 B1 | * | 6/2002 | Marrion et al. | 717/100 |
| 6,526,566 B1 | * | 2/2003 | Austin | 717/109 |
| 6,704,819 B1 | * | 3/2004 | Chrysanthakopoulos | 710/240 |
| 6,766,350 B1 | * | 7/2004 | Moreau | 709/200 |

(Continued)

FOREIGN PATENT DOCUMENTS

JP 08-077012 A 3/1996

(Continued)

OTHER PUBLICATIONS

Woodruff and Van Arsdall, "A large distributed control system using Ada in fusion research", 1998, Proceedings of the 1998 annual ACM SIGAda international conference on Ada, ISBN:1-58113-033-3, pp. 121-131.*

(Continued)

*Primary Examiner*—Tuan Dam
*Assistant Examiner*—J. Derek Rutten
(74) *Attorney, Agent, or Firm*—Sughrue Mion, PLLC

(57) ABSTRACT

A programming device comprising a group of program generation tools to generate programs for a plurality of devices that form part of a control system. A data sharing means is provided for sharing a variable name and attribute data definitions corresponding to an object of each of the devices for program generation. The data sharing means is shared by the program generation tools.

16 Claims, 10 Drawing Sheets

U.S. PATENT DOCUMENTS 6,854,111 B1 * 2/2005 Havner et al. .............. 717/163

FOREIGN PATENT DOCUMENTS

| JP | 10-23047 | 1/1998 |
| JP | 10-283241 | 10/1998 |
| JP | 2000-163107 | 6/2000 |
| WO | 0070417 A | 11/2000 |

OTHER PUBLICATIONS

"Using the SNAP Development Environment", 1998, Template Software, SNAP Version 8.0, Chapters 2 and 3.*

John Levine, "Linkers and Loaders", 2000, Academic Press, Chapter 1.*

Chou et al. "Versions and change notification in an object-oriented database system", 1988, Design Automation Conference, 1998 Proceedings, ISBN:0-8186-0864-1, pp. 275-281.*

International Search Report

Japanese Office Action dispatched Sep. 5, 2006.

* cited by examiner

| OBJECT NAME (81) | ATTRIBUTE DATA TYPE ADDRESS (82) | OBJECT LINK TABLE (83) ||||||||| UPDATE STATUS (84) |
|---|---|---|---|---|---|---|---|---|---|---|---|
| | | DISPLAY PC1 | DISPLAY PC2 | DISPLAY PC3 | CONTROL PC1 | CONTROL PC2 | CONTROL PC3 | COMMUNICATION PC1 | COMMUNICATION PC2 | COMMUNICATION PC3 | SYSTEM SUPERVISION | |
| NumberOfParts | INTEGER D100 NUMBER OF ELEMENTS 100 | 1 | 0 | 0 | 1 | 1 | 1 | 1 | 0 | 0 | 1 | 0 |
| ProcessParameter | INTEGER D200 NUMBER OF ELEMENTS 30 | 1 | 0 | 0 | 1 | 1 | 1 | 0 | 1 | 0 | 1 | 0 |
| ProcessAccuracy | INTEGER D300 NUMBER OF ELEMENTS 30 | 1 | 0 | 0 | 0 | 1 | 1 | 0 | 1 | 1 | 1 | 0 |
| Acceptance | BOOLEAN M100 NUMBER OF ELEMENTS 100 | 1 | 0 | 0 | 0 | 0 | 1 | 0 | 0 | 1 | 1 | 0 |

OBJECT LINK TABLE

| OBJECT NAME | ATTRIBUTE DATA TYPE ADDRESS | DISPLAY PC1 | DISPLAY PC2 | DISPLAY PC3 | CON- TROL PC1 | CON- TROL PC2 | CON- TROL PC3 | COMMUNI- CATION PC1 | COMMUNI- CATION PC2 | COMMUNI- CATION PC3 | SYSTEM SUPER- VISION | UPDATE STATUS |
|---|---|---|---|---|---|---|---|---|---|---|---|---|
| NumberOfParts | INTEGER D100 NUMBER OF ELEMENTS 101 | 1 | 0 | 0 | 1 | 1 | 1 | 1 | 0 | 0 | 1 | 1 |
| ProcessParameter | INTEGER D201 NUMBER OF ELEMENTS 30 | 1 | 0 | 0 | 1 | 1 | 1 | 0 | 1 | 0 | 1 | 1 |
| ProcessAccuracy | INTEGER D300 NUMBER OF ELEMENTS 30 | 1 | 0 | 0 | 0 | 1 | 1 | 0 | 1 | 1 | 1 | 0 |
| Acceptance | BOOLEAN M100 NUMBER OF ELEMENTS 100 | 1 | 0 | 0 | 0 | 0 | 1 | 0 | 0 | 1 | 1 | 0 |

(CONT.)

METHOD FOR PROGRAMMING A MULTIPLE DEVICE CONTROL SYSTEM USING OBJECT SHARING

DESCRIPTION

1. Technical Field

The present invention relates to a programming device for an entire control system including a programmable controller and more particularly to data definitions corresponding to objects, a method of sharing the data, a substantial reduction in a system building time realized by the data sharing, and a coordination between programs during system operating utilizing the shared objects.

2. Background Art

In a control system constructed of a variety of devices, such as programmable controllers, a display device as a display means and a system supervision device as a supervisory computer, program units necessary for operating the devices in the control system have conventionally been programmed by using separate dedicated tools, respectively and written into the associated devices, such as programmable controllers, a display device, communication units and a system supervision device, respectively.

Examples of these program units include control programs for the programmable controllers that perform controls on machines at intervals of about 10 msec; a display/input program for the display device that displays statuses of the machines and handles parameters for setting machine conditions; communication programs for the communication units that set communication parameters of the communication units in Ethernet, field networks, and the like, and a communication destination station to communicate with the destination station; and a system supervision application that monitors variables representing the statuses of the machines of the programmable controllers in relation to the system supervision device and, according to values of the variables, detects an anomaly of a production line to inform a worker at the production line. Each of program units is generated by the separate dedicated tool, from which they are downloaded into each of devices.

FIG. 8 is a status diagram showing an outline of operation when generating and writing program units in a control system including programmable controllers, a display device and a system supervision device.

In the figure, reference numeral 1 represents programmable controllers for controlling a group of machines 5; 2 a display device for displaying the statuses of the machines 5; 3 a system supervision device that detects an abnormal condition of a production line and informs the abnormal condition to a worker at the production line; 4 a network for connecting the programmable controllers 1 and the system supervision device 3; 5 the group of machines controlled by the programmable controllers 1; 6 a system design CAD for performing a system design of the entire production line; and 17 a peripheral device as a programming means which references system design data generated by the system design CAD 6 to generate individual program units for the programmable controllers 1, the display device 2 and the system supervision device 3.

Here, the programmable controller 1 has a control unit 11 that operates based on predetermined control program unit, an I/O unit 12 that interfaces with the machines 5, and a communication unit 13 that performs communication through the network 4 based on the predetermined communication program unit.

The system design CAD 6 generates a virtual object 61 which are defined generally on status information variables, condition setting variables and error information variables for the machines 5.

In building the system, the system design CAD 6 first designs system functions/processing and defines, by attributes such as variable names and data types that are common throughout the entire system, the virtual object 61 used in the system for controlling the machines which include, for example, input/output variable such as a control output and a status input, a data variable for setting condition for a machine operation, and an alarm object that describe an operation of searching for an associated program portion in the event of a system error to display the system error to the user.

Further, the peripheral device 17 has a display program generation tool 171 to generate a display program unit 171a for displaying status information on the machines 5 on the display device 2, a control program generation tool 172 to generate a control program unit 172a used in the control unit 11 of the programmable controller 1 for controlling the machines 5, a communication program generation tool 173 to generate a communication program unit 173a used in the communication unit 12 of the programmable controller 1 for establishing communication between the programmable controllers and the system supervision device 3 through the network 4, and a system supervision program generation tool 174 to generate a system supervision program unit 174a used in the system supervision device 3 for monitoring the state of the production line, detecting the abnormal condition of the line and informing the abnormal condition to the operator. The peripheral device 17 generates these program units separately.

Next, It will be described that an operation performed in generating the program units by the peripheral device 17 according to the virtual objects 61 to be controlled that is generated by the system design CAD 6, and downloading the generated programs to the programmable controllers 1, the display device 2 and the system supervision device 3.

The virtual objects 61 to be controlled are printed in a form of a table having the input/output variable, the data variable and the alarm object, and while referring to the printed table, the operator checks connections with the actual machines 5 and manually allocates physical addresses such as "X10", "Y20", "D100" and "M50" corresponding to the variables by using the display program generation tool 171, the control program generation tool 172 and the like, thereby generating program units such as control programs individually.

For example, the display program unit 171a that operates in the display device 2 connected to the control unit 11 is generated by the display program generation tool 171 which is prepared to correspond to the display device 2 and then written into the display device 2.

By the displaying program unit 171a being executed in the display device 2, the display program unit 171a uses the physical addresses such as "D100" and "M50", and retrieves data at specified addresses through communication ports of the programmable controllers 1, and replaces the retrieved data with a corresponding data variable, and finally displays on the display device 2 an operation status of the machines, a system operation situation and a diagnostic information retrieved from the machines by also using diagrams and tables.

Incidentally, in order to retrieve the specified data via the communication port of the programmable controller 1, it is necessary for retrieving an address variable assigned with an address "D100" in advance by the control program unit 172a to set the address information again so as to read the address "D100" by the display program unit 171a.

The control program unit 172a that controls the machines 5 is generated by the control program generation tool 172 prepared according to the kind of the control unit 11 and is written into the control unit 11 according to the input/output variable and the data variable, i.e., in reality by using the I/O and physical addresses of data such as "X10", "Y20", "D100", and "M50".

The communication program unit 173a used to access the communication unit 13 connected to the control unit 11 is generated by the communication program generation tool 173 prepared according to the kind of the communication unit 13, and the communication program generation tool 173 sets parameters, such as registration information on a communication destination and selection of communication means, and writes them into a nonvolatile memory of the communication unit 13, and the communication program unit 173a is written together with the control program unit 172a into the control unit 11.

For the programmable controller 1 (station number 01) playing a supervisory role to collect data on controlled objects, such as status variables and detailed error information, the communication program unit 173a running on the control unit 11 combines a read destination station number (such as "02" and "03"), a read data start address (such as "D200" and "D300") and a read data length, thereby converting them into a format, such as a communication packet used for communication to transfers it to the communication unit 13, and therefore the communication unit 13 can communicate with other applications on external computers and with other programmable controllers 1.

When the data variable that stores a state of the machine connected to the programmable controller 1 (station number 02) is assigned with an address "D200" by the control program unit 172a corresponding to this station, the address for the display program unit 171a needs to be assigned with "D200 of station number 02" so that the display program unit 171a can display the status of the machine connected to the programmable controller 1 of station number 02. Hence, the communication program unit 173a in the station number 01 must be programmed to read a read destination station number (such as "02" and "03"), a read data start address (such as "D200" and "D300") and a read data length according to the assigned address.

The system supervision program unit 174a running on the system supervision device 3 to retrieve values of the input/output variable and data variable, which are controlled objects, through the communication unit 13, is generated by the system supervision program generation tool 174 prepared according to the kind of the communication unit 13 and is written into the system supervision device 3.

Running on the system supervision device 3, the system supervision program unit 174a uses the data variable corresponding to the object to display the operation state of the system and to identify the location of an abnormal condition by using diagrams and tables.

For this purpose, the system supervision device 3 needs to use the data variable addresses ("D100", "D200", "D300", "D500", etc.) of objects defined previously by the control program unit 172a, display program unit 171a and communication program unit 173a and to program the data variable addresses through the communication units 13 of the programmable controller 1 of such as destination number "01", destination number "02", and destination number "03", for example, a read destination station number "01"/read data start address "D100"/read data length of 300, a read destination station number "02"/read data start address "D500"/read data length of 100, and a read destination station number "03"/read data start address "D500"/read data length of 100.

It is necessary for generating the program units such as the programmable controllers according to the system design to refer the input/output variables, data variables and other objects for controlling the machines, individually to program the definition of names in the system, and to allocate the address in each of the program units.

Hence, although the "variables representing the statuses of the machines", "variables for setting the conditions of the machines", "objects describing the operations performed in the event of a system error" and the like together form a single object in the actual production line, it has to be defined repetitively by using separate tools dedicated to individual devices that from which address in each program, such as "D100" and "M50", the variable data should be read. The programming efficiency therefore is low.

It is of course possible to individually generate program units for the programmable controllers and run them as a system, however, consider a case for example in which a simple system change is made, such as adding a status variable in the middle of the program, when the address allocation for the data variable in each program unit is changed from 50 elements beginning with "D100" to 50 elements beginning with "D101" in an array format for example, the programming tools for the display program unit 171a, the control program unit 172a and the communication program unit 173a need to boot the associated program units, to change the address allocation to 50 elements beginning with "D101" in the array format, and to write the modified content into the programs, requiring too much time and cost.

While many objects can be shared between the display/supervision applications of the display program unit 171a and system supervision program unit 174a and the control system application of the control program unit 172a, there is no mechanism available that permits an interchange of common objects between different types of machines of the same manufacturer or between programming tools of devices of a plurality of manufacturers, and as the system scale increases, the cost of managing the shared objects and reflecting changes on the system by man power becomes large.

DISCLOSURE OF THE INVENTION

The present invention has been accomplished to overcome the problems described above. A first object of the invention is to provide a programming device which allows objects defined in the system to be shared among program generation tools thereby facilitating building of the system.

A second object is to provide a programming device which, when sharing an object, selects devices that share the object to enable automatic notification to these devices, thereby reducing the work load of the program generation tools in the devices.

Further, a third object is to provide a programming device which reduces the load of defining the objects to be shared and of changing the definitions.

Further, a fourth object is to provide a programming device which makes effective use of existing objects to reduce the object registration process and facilitate the building of the system.

Further, a fifth object is to provide a programming device which improves reliability of the object registration process.

Further, a sixth object is to provide a programming device which can modify programs easily according to object changes.

Further, a seventh object is to provide a programming device which facilitates coordinated actions of various programs during system operation.

To achieve the objectives, according to a first aspect, a programming device comprises: a group of program generation tools to generate programs for each of devices constructing a control system; and a data sharing means for sharing a variable name and attribute data definitions corresponding to an object of each of devices for program generation, wherein the data sharing means being shared by the program generation tools when building or operating the system.

Particularly, programming in anyone of the program generation tools is as a trigger to store a setting of the object to the data sharing means together with an indication of the program generation tools which is a reference object, and the sharing of said object with other program generation tools notifies said object to the program generation tools which is the reference object.

Further, a system configuration tools is provided, which is already registered with some objects, as basic types, having high frequencies of use in the devices in the control system, the system configuration tool for selecting from the registered basic type objects an object to be actually used in the control system.

Further, a system configuration tool is provided, which is already registered with some objects, as basic types, having high frequencies of use in the devices in the control system, the system configuration tool for selecting from the registered basic types an object to be actually used in the control system.

Further, a programming device comprises a group of program generation tools for generating programs for each of devices constructing a control system, wherein anyone of the program generation tools performs data definition of a variable name and attribute data corresponding to an object in each of devices, and whereby the variable name and attribute data corresponding to said object are stored to enable to be used by other program generation tools.

Further, in case of storing the variable name and attribute data corresponding to the object, whether or not the object is referenced by other program generation tools is registered and the object is notified to the program generation tools which is the reference object.

Further, when event relating to the object such as system error occurs as coordinated actions of various programs during system operation, the program generation tools referencing the object is notified and displays the affected program.

Further, a detection means is provided for detecting any overlap with objects at a referenced part when a program is generated by other program generation tools.

Further, when an object is changed in a basis of a particular program generation tool, the changed object is notified to the program generation tools which is the reference object.

Further, the object is notified to a storage area which is confirmed by the program generation tools when they are started.

Further, a programming method according to the invention for generating programs for devices constructing a control system, the method comprises the steps of: according to a pre-designed virtual object, defining an object name and attribute data corresponding to an object of each of devices, specifying a device using the object, and registering in a data sharing means; notifying the object to a program generation tool for the specified devices using the object; and according to the objects registered in the data sharing means, performing programming of the device by the notified program generation tools.

BEST MODE FOR CARRYING OUT THE INVENTION

Next, embodiments of the present invention will be described in the following.

Embodiment 1

Figure 1:
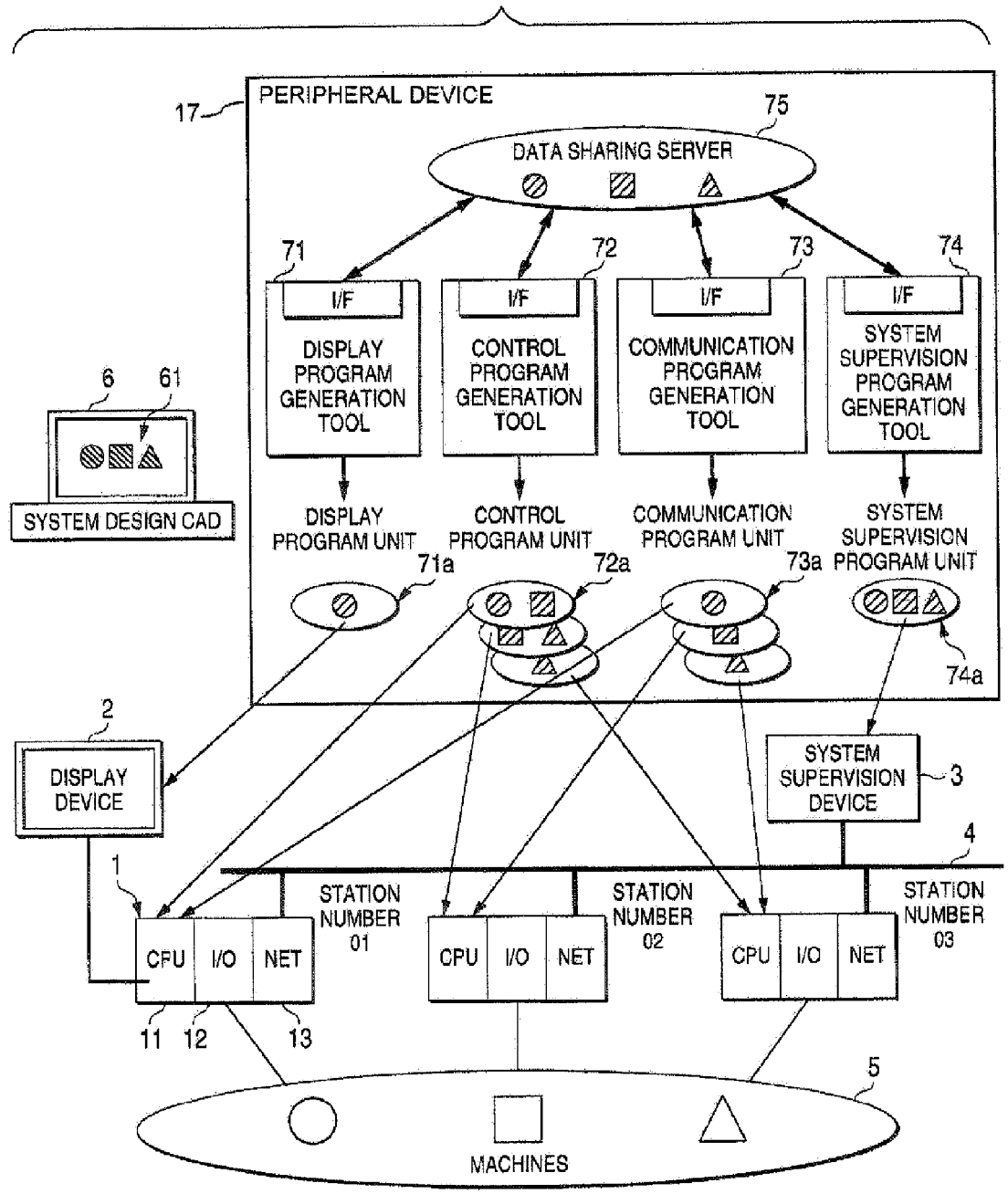
FIG. 1 is a status diagram showing an outline operation of a control system according to a first embodiment of the invention.

FIG. 1 is a status diagram showing an outline operation performed when generating and writing program units in a control system constructed of a programmable controller, a display device and a system supervision device, and represents a basic configuration of a data sharing programming device.

In the figure, reference numeral 1 represents a programmable controller which controls a group of machines 5 and performs communication via network by running a control program unit and a communication program unit; 2 a display device which downloads and runs a display program unit to display, for example, a state of the machines 5; 3 a system supervision device which runs a system supervision program unit to detect, for example, an abnormal condition in a production line and inform it to a worker at the production line; 4 a network for connecting the programmable controllers 1 and the system supervision device 3; 5 a group of machines controlled by the programmable controllers 1; 6 a system design CAD which performs a system design on the entire production line and defines virtual objects to be controlled; and 7 a peripheral device as a data sharing programming means which refers to the system design data generated by the system design CAD 6 and generates program units individually for the programmable controllers 1, the display device 2 and the system supervision device 3.

Here, the programmable controller 1 has a control unit 11 operating according to the predetermined control program unit, an I/O unit 12 interfacing with the machines 5, and a communication unit 13 for performing communication via the network 4 according to the predetermined communication program unit.

Also, the system design CAD 6 generates the virtual objects 61 defined generally on a status information variable/a condition setting variable/an error information variable for the machines 5.

In case of building the system, the system design CAD 6 first designs system functions and processing, and defines, for example, an input/output variable such as a control output and a status input, a data variable for setting a machine operation condition, and an object that describes an operation to be carried out in the event of a system error by attributes such as variable names and data types that are common throughout the entire system, as the virtual objects 61 used in the system for controlling the machines.

Further, the peripheral device 7 has a display program generation tool 71 to generate a display program unit 71a for displaying a status information on the machines 5 on the display device 2, a control program generation tool 72 to generate a control program unit 72a used in the control unit 11 of the programmable controller 1 for controlling the machines 5, a communication program generation tool 73 to generate a communication program unit 73a used in the communication unit 12 of the programmable controller 1 for establishing communication between the programmable controllers and with the system supervision device 3 through the network 4, and a system supervision program generation tool 74 to generate a system supervision program unit 74a used in the system supervision device 3 for monitoring the state of the production line, detecting an abnormal condition of the line and informing it to the operator, and the peripheral device 7 generates each of these program units separately.

The peripheral device 7 has an object definition data sharing server 75 as a data sharing means to share object data referenced by a plurality of program generation tools, and each of the program generation tools has an interface unit to update the data sharing server 75.

While in this embodiment the data sharing server 75 is installed inside the peripheral device 7, the peripheral device 7 may be built as a separate entity connected by the network and, for example, it may be realized as one function of the system design CAD 6.

Figure 2:
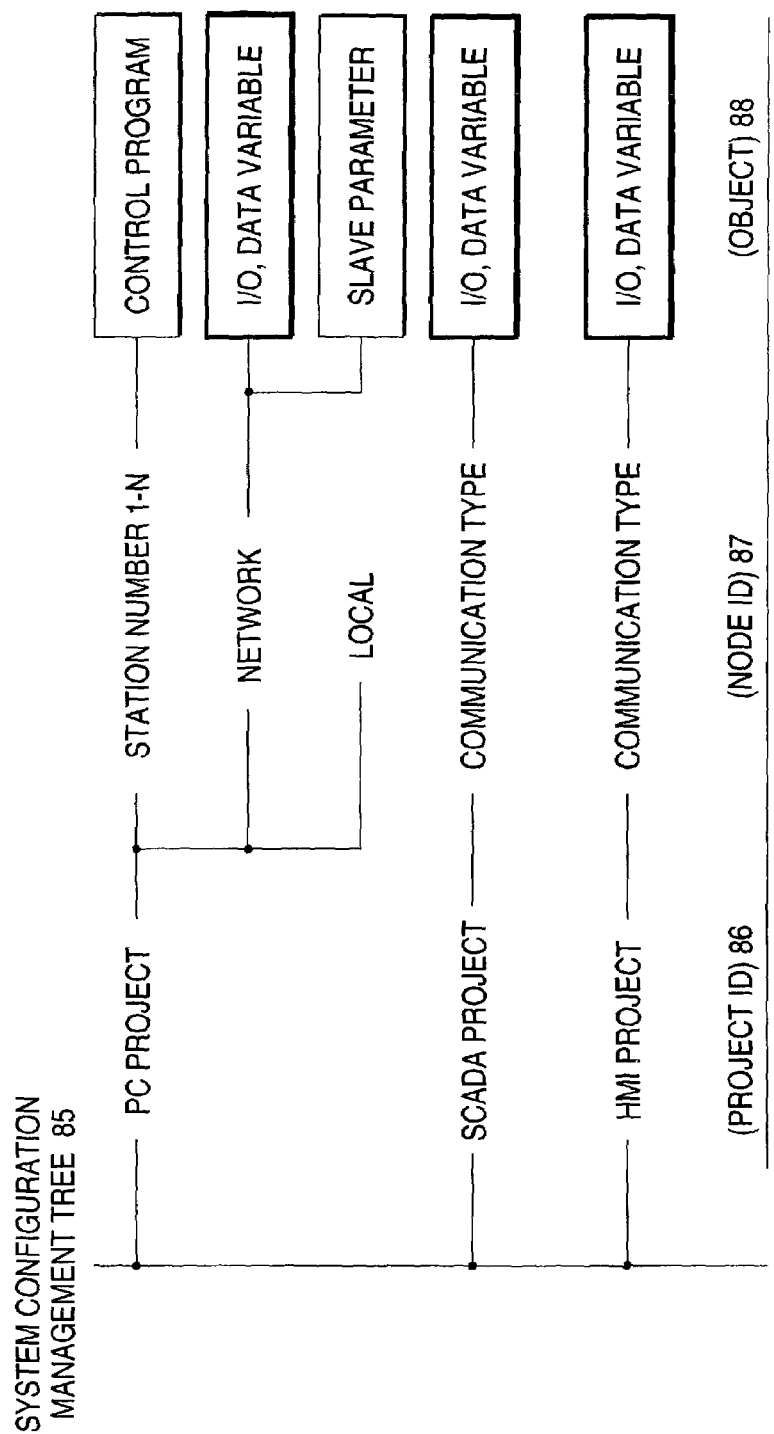
FIG. 2 is an object management table of a data sharing programming device and an related system configuration management tree.

FIG. 2 shows, in the data sharing server 75 for sharing the object data, an object management table defining which program unit in each device refers to an object and also a system configuration management tree of a related object.

In the figure, reference numeral 81 represents an object name used in each program unit, 82 a data type, a physical address of a variable used and an attribute showing the number of data, and 83 an object link table showing that which program unit of each device refers to each object. The tables sets "1" when this object is referenced by the device and "0" when not referenced.

Reference numeral 84 denotes an update status indicating whether the attribute 82 of the object or the object linked table 83 has been updated or not. When it is updated, "1" is set; and when the reflecting of update is completed or when they are not updated, "0" is set.

Reference numeral 85 denotes the system configuration management tree making a situation of each object in the system clear for management. Reference numeral 86 denotes project identifiers ID at a first level class of the tree, such as a PC (control/communication) project, a SCADA (system supervision) project and an HMI (display) project;

and reference numeral 87 denotes node identifiers ID at a second level class of the tree, such as a station number, a network type and a communication type.

Reference numeral 88 denotes objects at a third level class of the tree, such as a "control program", a "slave parameter" read into a PC network master unit in a form of a parameter file to enable communication with a slave device via the network, an "I/O and data variable" used in the PC project, "I/O and data variable" used in the SCADA project, and "I/O and data variable" used in the HMI project.

An example of FIG. 2 shows that 100 variables are allocated as attributes of an address "D100" in an array type defined by an object "Number of Parts" and are referenced by the display program unit 71a, control program unit 72a and communication program unit 73a of the programmable controller station number 01 (hereinafter referred to as a PC station number), by the control program unit 72a of the PC station number 02, by the control program unit 72a of the PC station number 03 and by the system supervision program unit 74a.

Other objects "Process Parameter", "Processed Accuracy" and "Acceptance" shows similarly to be defined, to be allocated addresses and to be set whether or not to refer to these objects. Initial settings for all objects have the update status 84 of 0.

Further, to check where the objects of the object management table are situated in the system configuration, the objects are managed in a form of the system configuration management tree 85. The tree is used to search for an object as viewed in terms of the system configuration according to a combination of the project ID and the node ID and, when an object is changed, to perform backward search to determine which control program is related.

Next, by referring to FIG. 1 the operation will be explained that is performed when the peripheral device 7 generates the program units according to the virtual objects 61 to be controlled that are defined by the system design CAD 6 to download the generated program units to the programmable controller 1, the display device 2 and the system supervision device 3.

During an initial setting of the control system, the contents of the virtual objects 61 to be controlled are printed in a form of a table of objects such as the input/output variable, the data variable and an alarm. While an operator refers to the printed table, the operator manually allocates physical addresses such as "X10", "Y20", "D100", and "M50" corresponding to the variables by using the display program generation tool 71 and the control program generation tool 72 while checking the actual connection with the machines 5, thereby generating the control program.

At this time, for a purpose of using in shared parts of the system, the program generation tool adds an attribute data setting column to a normal variable setting screen thereof to generate objects and their attribute data in the form of variable name and allocated address. When the object is stored, connecting a circuit to the data sharing server 75, addition/modification/deletion of the objects, processing of the modified statuses and disconnecting the circuit from the server through the interface unit built into the program generation tool to transfer and resister the generated objects and the attribute data thereof to the object management table in the data sharing server 75. "Database access commands" that the interface unit can use for the data sharing server are "Open" for connection of an access circuit, "Add/Mod/Del" for addition, modification and deletion of objects, "Run: Script" for booting a script which is the information to be executed when the objects are modified during the modified status processing, and "Close" for disconnecting the access circuit. In this case, the script executed by the "Run: Script" is "display a screen for setting an address conversion, an object link and a system configuration management tree according to the attribute data."

Then, according to the script, the data sharing server 75 displays the screen for setting whether or not the object is referenced by other program units and for setting the system configuration tree. The operator selects whether or not the object is referenced by other program units. When the object is to be referenced, the operator sets the project IDs and node IDs to be used and stores them as the system configuration management tree. When the operator completes and stores the setting of the object management table and the system configuration management tree, the server issues a "Post Modify" command to notify the modification of the object. This command performs a backward search through project IDs and node IDs to find the projects that use the modified object to boot the program generation tools for the projects. In this way, the data sharing server transfers the content of the object to be referenced to the program generation tools referring to that object.

In this case, when the program generation tools that reference the object are connected to the data sharing server 75 through the interface units built into the tools, the contents of addition, modification and deletion of the referenced object are transferred at this time. If the program generation tools are not connected, a message queue in a storage area causes the tools, when they are booted or when the programs are stored, to connect to the data sharing server 75 to retrieve the latest content to check if the object to be used has been modified.

For example, the control program unit 72*a* for controlling the machines 5 is generated by the control program generation tool 72 prepared according to the kind of the control unit 11, and is then written into the control unit 11 according to the input/output variable and data variables which are defined by the names used in the tool.

At this time, in addition to generating the control program unit 72*a*, the control program generation tool 72 generates the object and its attribute data to be used for the control in the form of the variable name and allocated address for use in the entire system by using the setting screen of the control program generation tool 72.

Next, the variable name and the attribute data thus generated are transferred through the interface unit to the object management table in the data sharing server 75 by the database access command of "Open/Add/Close" for circuit connection, object addition and circuit disconnection. The update status 84 is newly registered as ON (1). The data sharing server 75 displays the screen for setting whether the program is referenced by other program units and for setting the system configuration management tree. The operator sets whether or not the object is referenced by other programs and, when the object is to be referenced, sets related project IDs. When this setting is complete, the server issues a "Post Add" command for notifying the addition of the object to transfer the content of the object to the program generation tools referencing that object.

Similarly, the display program generation tool 71, the communication program generation tool 73 and the system supervision program generation tool 74 also generate an object and its attribute data in the form of the variable name and the allocated address for use in the entire system.

When the variable name of the generated contents and the allocated address of the attribute data are already registered and their reference flag is 1 so as to overlap those of another object transferred, the associated program generation tool displays an alarm message and modifies the generated content so as not to overlap the previous content, and the modified content is transferred to the data sharing server 75 to register the update status 84 as ON.

When finally all program units are generated, the program generation tool executes an object matching check script of the data sharing server 75 by the "Run: Script" command through the interface unit to check if there is any overlap in the object name and attribute allocation address. When an overlap is found, the content of the object management table is corrected by the data sharing server setting screen, and after eliminating the overlap, the update statuses 84 of all objects is changed to OFF (0). (See FIG. 2A).

As described above, in generating the first program units during the initial setting of the control system, the operator refers to the virtual objects, which are printed as a table of their input/output variables and data variables, and manually allocates physical addresses such as "X10", "Y20", "D100" and "M50" corresponding to the variables by checking the actual connection with the machines.

However, for the object and its attribute data whose address allocation is completed, since the program unit referencing the object and its attribute data is set in the data sharing server 75 and, during the generation of next program unit, the object and its attribute data to be referenced are transferred from the data sharing server 75, it does not need to define the names in the system and to allocate the address in each program unit, thus improving the programming efficiency.

Further, in an example of system operation, an input variable such as a sensor monitoring the system status, a condition for determining a system error when the variable is a particular value, and an associated program unit referencing the input variable are associated with each other to be defined as an alarm object. In the event of a system error, the "Run: Script" is executed to perform a backward search through the project IDs to find and boot the program generation tool for the program unit that references the alarm object, thereby displaying a part of the program unit associated with the system error to supply the operator with an information for identifying the system error cause.

Figure 3:
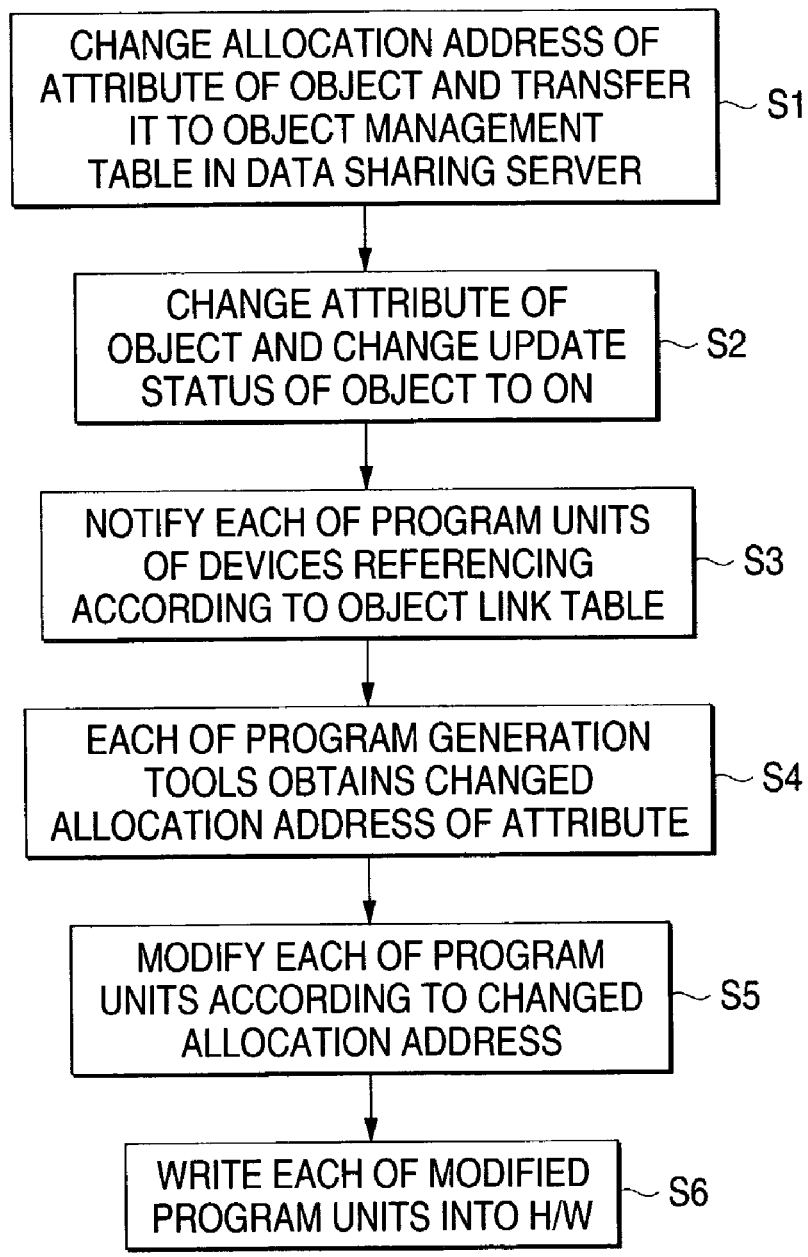
FIG. 3 is a flow chart showing an operation of the programming device in the first embodiment.

Next, a case where the number of array elements in the object is changed for some reason during the system adjustment will be explained by referring to the flow chart of FIG. 3.

When, during the generation of the control program unit 72*a* by the control program generation tool 72, the number of array elements for the object name "Number of Parts" is changed, due to the system adjustment, from 100 to 101, the number of attributes for the object "Number of Parts" is changed from "100" to "101" and the allocated address for the "Number of Parts" takes up as far as "D200". It is therefore necessary to change the attribute allocation address for the object "Process Parameter" from "D200" to "D201".

In case of changing the attribute allocation address for the object "Process Parameter", for example, from "D200" to "D201", in step S1, the control program generation tool 72 changes the allocated address corresponding to the variable name of the object to "D201" in the address setting column on the variable setting screen, and when "data transfer to server" function of the control program generation tool 72 is selected on the screen or when the program unit including the variable, for which the value and the like in the address setting column is changed, is saved, connecting the circuit to the data sharing server (database access Open command), searching the corresponding object (Find command), writing new data into the corresponding object (Modify command) and disconnecting the circuit (Close command) are performed through the interface unit built into the control program generation tool 72, and then the modified contents are transferred to the object management table in the data sharing server 75 and "Run: Script" is executed. (See FIG. 2B).

Consecutively, in step S2, the data sharing server 75 compares the corresponding object with registration history according to the script and, if the corresponding object is new, updates with the new content and changes the update status 84 for the object to ON, and then moving to step S3.

In step S3, with the update status set to ON, the data sharing server 75 searches for the reference flag of the object link table 83 (1: referenced, 0: not referenced) to see if the object is referenced by other devices, and if the object is being referenced (1: when referenced), the server issues the "Post Modify" command through the interface units that perform programming for the referencing devices to notify the updated object name 81 by program-to-program message communication means, a network, or the like.

It may be configured so that the notification of the updated object name 81 is received in the message queue as the storage area in the program generation tools. If the associated program generation tools itself are not booted, the notification may be read from the message queue by the tools, when are booted next time, to recognize the notification.

Then, in step S4, the notified program generation tools request the latest attribute data 82 concerning the object referenced by the programs to the data sharing server 75 by using a "Read command". The data sharing server 75 in response to the request returns the modified allocation start address of "D201" as the latest attribute data 82 and the number of data of 30, and changes the update structure to OFF, and then moving to step S5.

In step S5, the program generation tools that have received the modified allocation start address of "D201" and the number of data of 30 search the corresponding variable through a variable table inside the program source according to the modified allocation address of the object, and change the content in the address column of the corresponding variable to "30 (words) beginning with D201" to generate the programs again so that they can be executed.

Then, in step S6, the program generation tools write each of program units that were generated by sharing the object reflecting the allocated address as the latest attribute data into each of H/Ws, and thereby the correction process is complete.

As described in the above operation, when the attribute of the object is changed, the data sharing server 75 changes the modification status of the modified object from "OFF: 0" to "ON: 1" and then notifies the content of modification to the program units that reference the object whose modification status was changed to "ON: 1", thereby modifying the address of each program unit. Thus, simply changing the attribute data of the object in one program unit by using only one of the program generation tools can make a system change at one time without having to repetitively use associated program generation tools and change other program units referencing the object. This can achieve a substantial reduction in time required to build the system.

If the data sharing server 75 and the program generation tools are built as applications running on the peripheral device 7, the programs having these functions are distributed on electronic data recording medium such as an optical recording medium or magnetic medium. The functions are realized by running the programs on the peripheral device 7.

Embodiment 2

Figure 4:
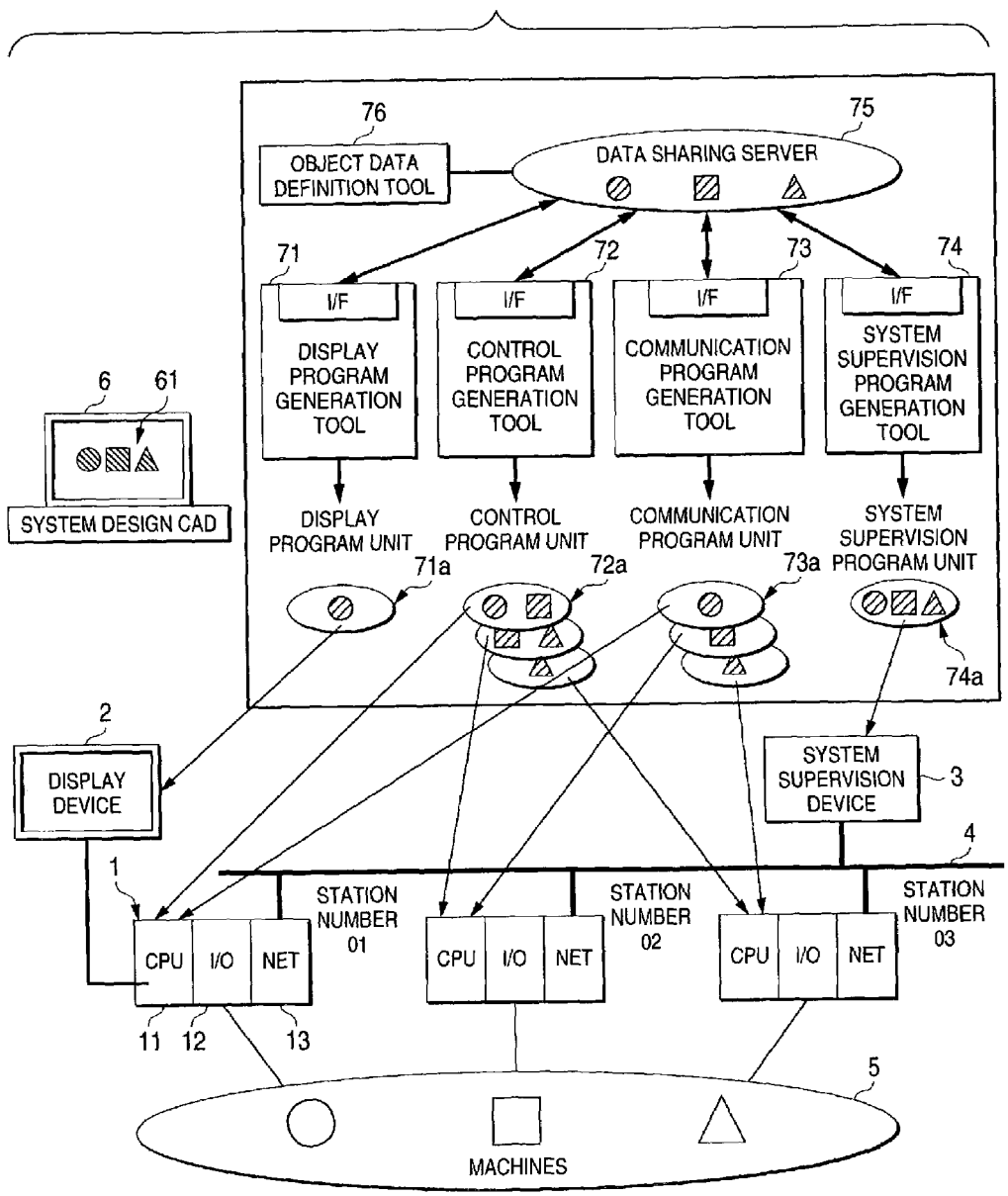
FIG. 4 is a status diagram showing an outline operation of the control system according to a second embodiment of the invention.

FIG. 4 shows a basic configuration of a data sharing programming device in which an object data definition tool 76 to define and change object data for the data sharing server 75 is added to the peripheral device 7 explained in the embodiment 1.

The content of the object management table according to the first embodiment is generated by the setting screen of the program generation tool and transferred through the interface unit built thereinto by performing connection of the circuit (Open command), addition, modification and deletion of an object (Add, Mod, Del), and disconnecting of the circuit (Close). In the object management table according to this embodiment, the definition and modification of the object can be done directly based on the object data definition tool and the defined or modified contents can also be reflected in the entire system through the server.

Next, the operation when the dedicated object data definition tool 76 is used will be explained by referring to FIG. 4.

According to the virtual objects 61 to be controlled which are defined by the system design CAD 6, the object data definition tool 76 sets the object name 81, its attribute data 82 to be used by display, control, communication and system supervision, and which program in each of devices refers to the object in the object link table 83, and changes the update status 84 to ON and writes them into the object management table.

The data sharing server 75 notifies the object whose update status 84 is ON to the program generation tools referencing that object by the message communication, the network, or the like through the interface unit.

The informed program generation tools request the retrieval of the variable name and attribute data of the newly registered object to the data sharing server 75 when they generate program units. After transmitting the information on the object, the data sharing server 75 changes the update status of the object to OFF. Then, each of program generation tools generate each of program units by using the variable name and the attribute data such as allocated address, transmitted from the data sharing server 75 in response to the request.

Figure 5:
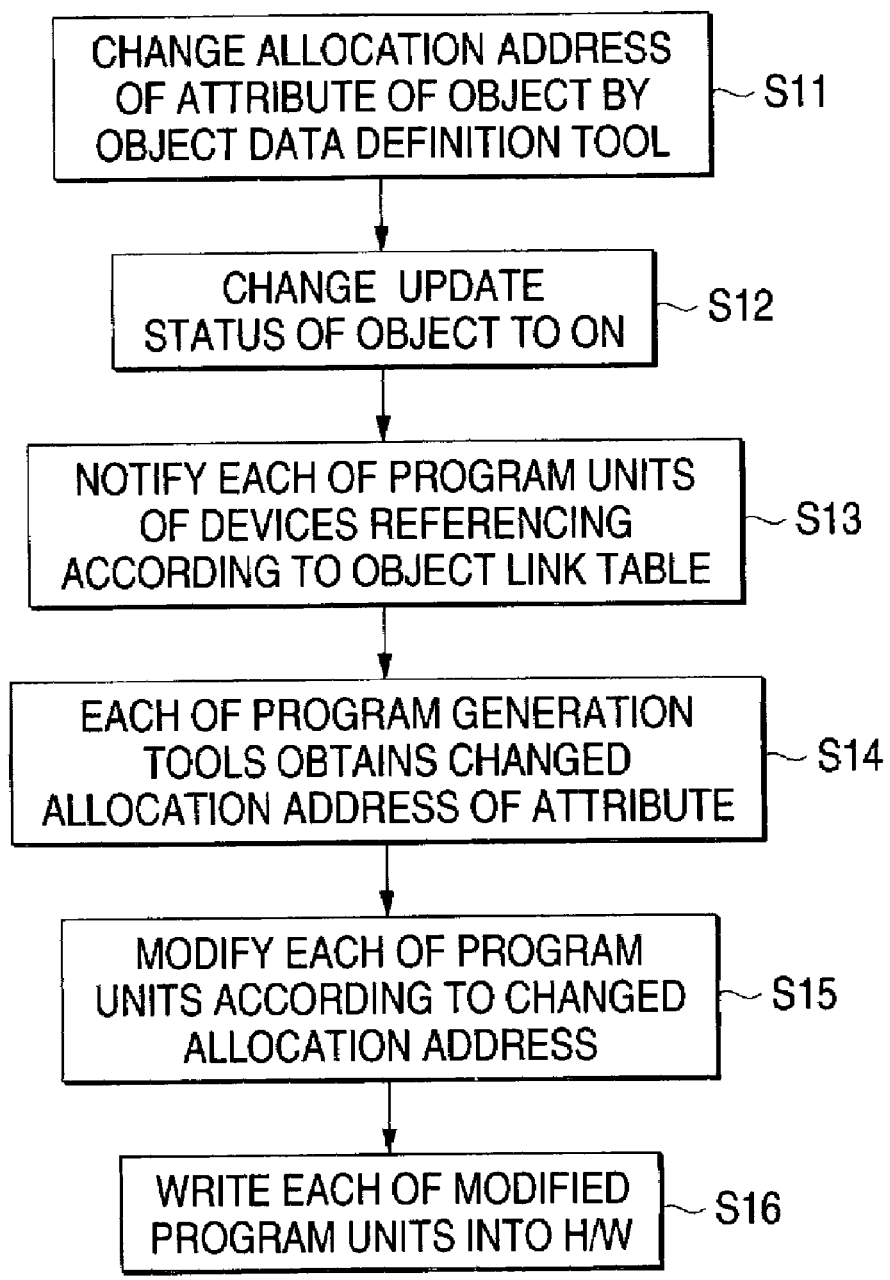
FIG. 5 is a flow chart showing an operation of the programming device in the second embodiment.

Next, the operation performed when the system specification is changed after the program units have been generated will be explained by referring to a flow chart of FIG. 5.

When the allocated address of the object "Process Parameter" is to be changed from "D200" to "D201", the object data definition tool 76 changes the allocated address of the attribute data of the corresponding object to "D201" in step S11.

Then, in step S12, the data sharing server 75 changes the update status 55 of the object, whose attribute was changed, to ON, and then moving to step S13.

In step S13, with the update status changed to ON, the data sharing server 75 searches the reference flag of the object link table 83 (1: referenced, 0: not referenced) for whether the object is referenced by other devices. When the object is being referenced (1 when referenced), the data sharing server 75 notifies the updated object name to the program generation tools by an inter-program message communication means or network through the interface units that perform programming for the associated devices.

The notification of the updated object name 81 may be constructed to be received in the message queue in the program generation tools. If the program generation tools are not running, the notification is read from the message queue when they are booted next time to recognize being notified.

Then, in step S14, each of the notified program generation tools requests the latest attribute data 82 concerning the object referenced by the programs for the data sharing server 75. The data sharing server 75 responds the modified allocation address of "D201" as the latest attribute data 82, and changes the update status to OFF, and then moving to step S15.

In step S15, each of the program generation tools that has received the modified allocation address of "D201" changes the addresses of the program units according to the modified allocation address of the object and generates the program again to be in a executable state.

Then, in step S16, the program generation tools write into each H/W, each program unit that was generated by sharing the object reflecting the allocation address as the latest attribute data. Now, the correction process is complete.

According to the operation, in addition to the above described advantage of the embodiment 1, the object management table can easily be defined and changed by the object data definition tool, and a management cost of the object shared by the system can be reduced.

Further, there are provided a object data definition tools to define the attribute corresponding to the object of the programmable controller and the data sharing server for managing the data. The data sharing server has a function for automatically notifying the data to and reflecting the data on the program generation tools as an application for referencing the data from the server to centralize a data management/definition in the system constructed of each of the applications, and whereby the attribute definition and modification is completed at one time without having to repeat the same process using different tools and the time taken to build and change the system applications can be reduced substantially by automatically notifying the data to and reflecting the data on the applications of the program generation tools referencing the data.

Further, in an example of system operation when dealing with an alarm object, information instrumental in identifying a possible cause of system error is provided as in the embodiment 1.

Embodiment 3

Figure 6:
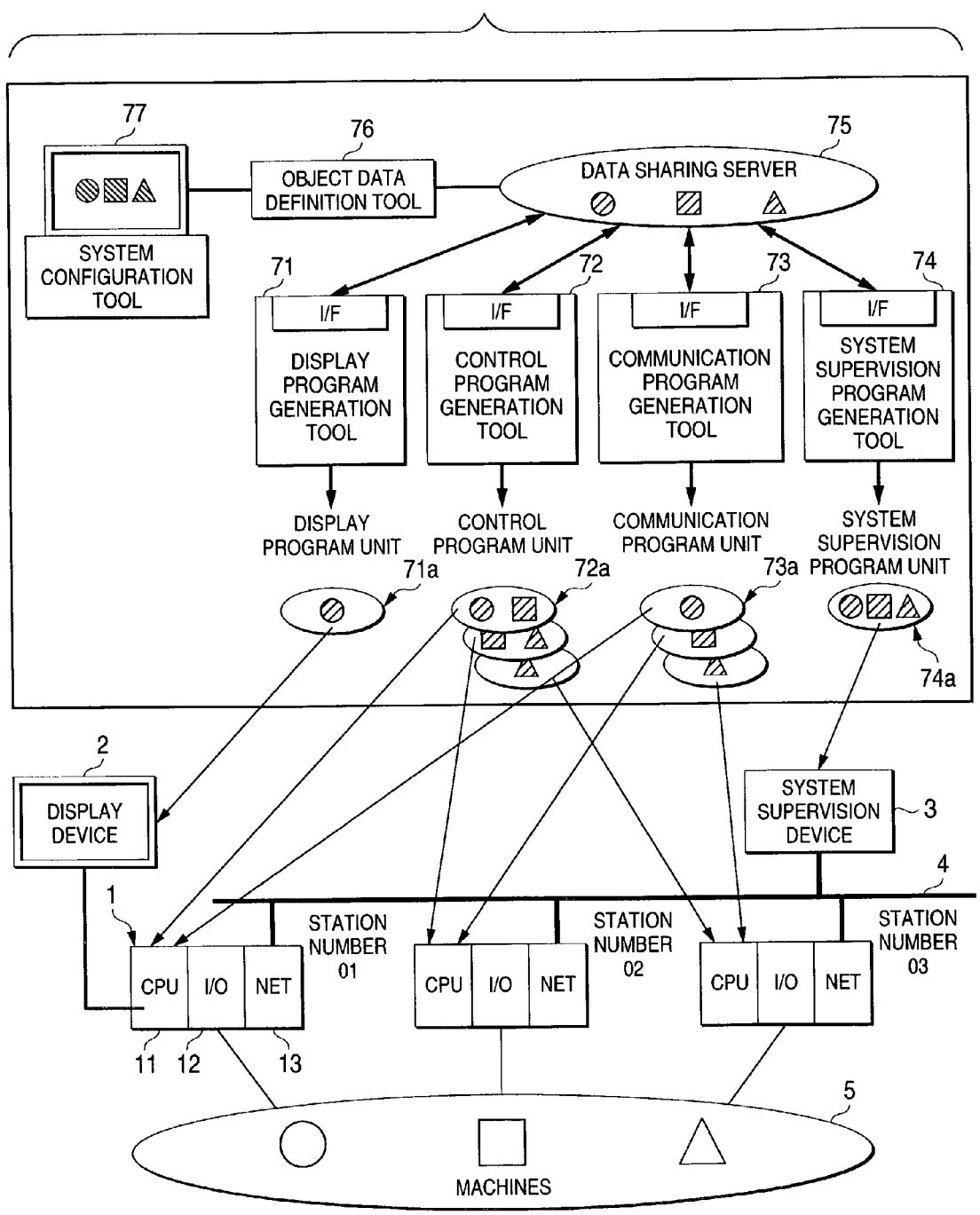
FIG. 6 is a status diagram showing an outline operation of the control system according to a third embodiment of the invention.

FIG. 6 shows a basic configuration of a data sharing programming device in which a system configuration tool 77 of the same configuration as the system design CAD 6 is added to the peripheral device 7 explained in the embodiment 2. The system configuration tool 77 selects an object to be actually used from among registered, highly useful controlled objects and change the definition according to the data of the selected object, the registered objects having been used in building previous systems and, after the completion of the systems, registered for future use in the building of other systems.

Figure 7:
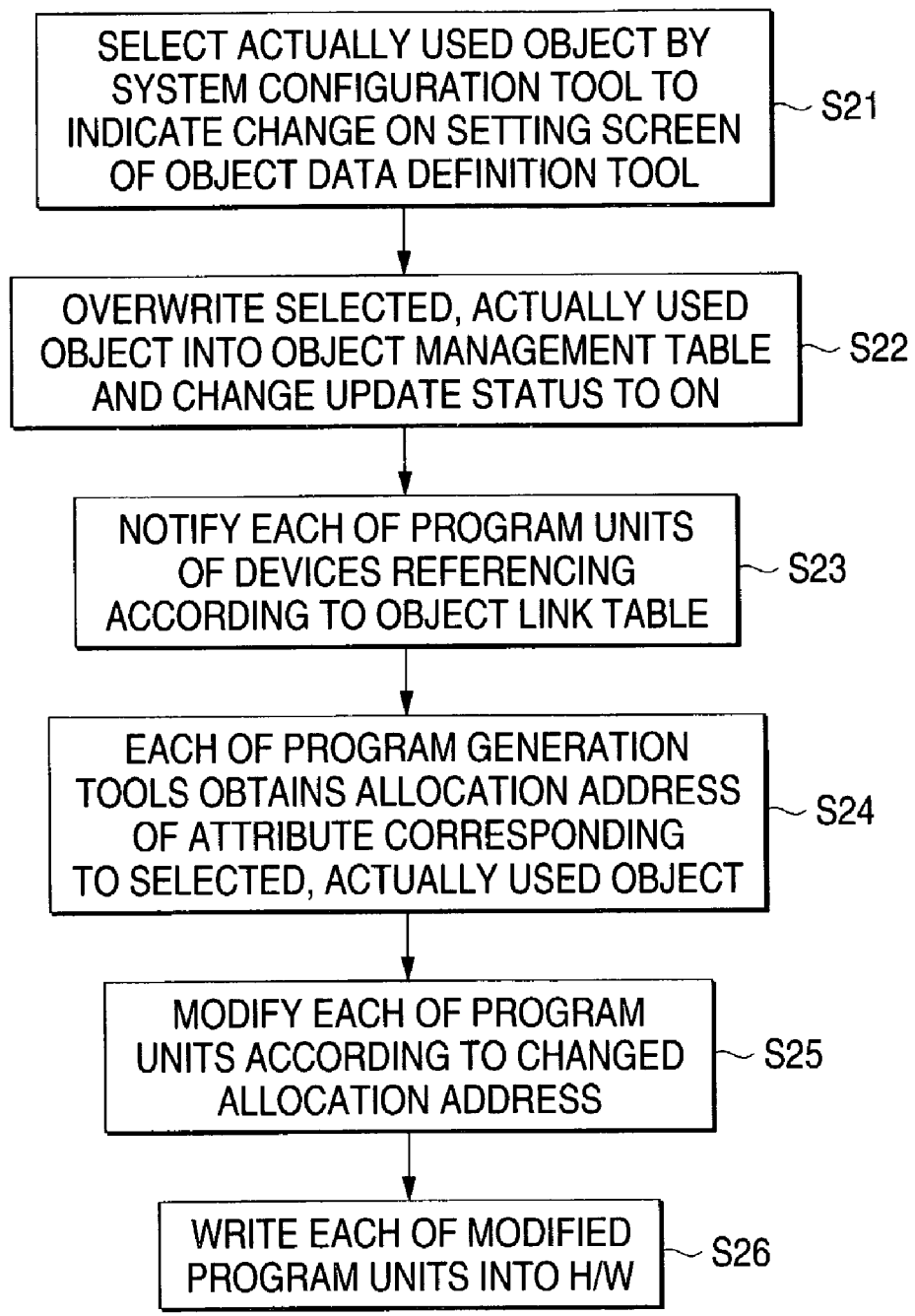
FIG. 7 is a flow chart showing an operation of the programming device in the third embodiment.
Figure 8:
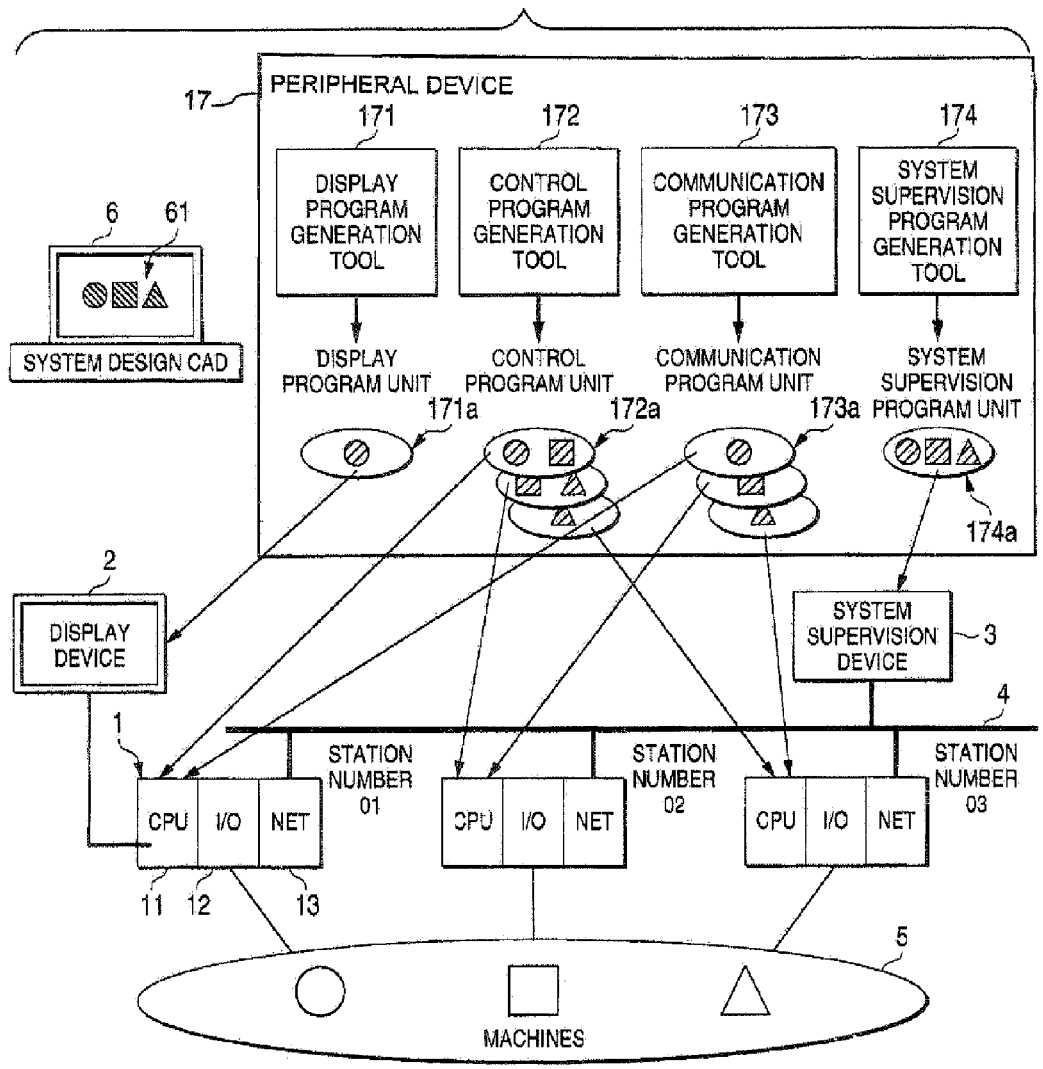
FIG. 8 is a status diagram showing an outline operation of a conventional control system.

This embodiment concerns the operation when a part of an existing fundamental system is changed to construct an intended system. The operation using the system configuration tool 77 based on the system design CAD 6 will be described by referring to a flow chart of FIG. 7.

First, in step S21, in the system configuration tool 77 the user selects an object to be actually used from the registered, controlled virtual objects and indicates on the setting screen of the object data definition tool 76 to change the object temporarily defined in the object management table (for example, with an attribute of address "D200") to an object of the same name with a different attribute which will actually be used (for example, "D201"). Then the process moves to step S22.

In step 22, the new object is overwritten into the object of the same name temporarily defined to be written into the object management table of the data sharing server 75.

Then, in the data sharing server 75 the user may, if necessary, modify the object link table 83 on the setting screen, which indicates whether the object is referenced by each of programs of devices, and then change the update status to ON.

Then, in step S23, with the update status changed to ON, the data sharing server 75 searches the reference flag in the object link table 83 (1: referenced, 0: not referenced) to determine whether the object is referenced by other devices. When the object is being referenced by other devices (1 when referenced), the data sharing server 75 notifies the updated object name to each of program generation tools by an inter-program message communication means or network through the interface units that perform programming for the associated devices.

The notification of the updated object name 81 may be constructed to be received in the message queue in the program generation tools. If the program generation tools are not running, the notification is read from the message queue by the tools when they are booted next time to recognize the updated object.

Then, in step S24, the notified program generation tools request for the data sharing server 75 the latest attribute data 82 concerning the object referenced by the programs. The data sharing server 75 responds the modified allocation address of "D201" as the latest attribute data 82, and changes the update status to OFF, and then moving to step S25.

In step S25, the program generation tools that have received the modified allocation address of "D201" changes the addresses of the program units according to the modified allocation address of the object and generates the programs again so that they can be executed.

Then, in step S26, the program generation tools write into each H/W, each program unit that was generated by sharing the object reflecting the allocation address as the latest attribute data. Now, the correction process is complete.

With the operation described above, in addition to the above described effect of the embodiment 1, when a part of an existing fundamental system is changed to construct an intended system, the system configuration tool 77 is used to select an object to be actually used from the registered, controlled virtual objects 61, and whereby each of the program units are automatically generated without requiring manual processes.

Further, the system configuration tool 77 can be incorporated to the program generation tools of other devices used in the system, such as a system supervision device which is dedicated to the user, thereby realizing a significant reduction in the management cost of the shared objects which would otherwise increase as the system scale increases.

Because of the configuration described above, the invention can share the objects defined in the system among the program generation tools, facilitate the building of the system, shorten the time required to built the system and facilitate the coordinated action during the system operation among the programs interlinked through the shared objects, which in turn improves the work efficiency.

In sharing the objects, devices which share the objects are selected, thereby enabling automatic notification for the devices which share the objects. The automatic notification allows the operator to work with the program generation tools sharing the objects without having to be conscious of the notification, thus enabling to improve the program generation efficiency.

Further, because of the definition and modification of the shared objects can be done at one time, these processes are facilitated and the management of the objects themselves is also facilitated, thus enabling to improve the efficiency of the works that have conventionally been performed manually.

Further, the previously used objects can be put to effective use to reduce the object registration and to facilitate the construction of the system.

Checking for any overlapping of the objects can improve the reliability of the object registration work.

Furthermore, the modifications of programs according to changes in objects can be done easily.

INDUSTRIAL APPLICABILITY

As described above, the programming device and the programming method according to the invention are suited for use in a method of defining data for objects and sharing the objects and in a programming device that builds a system by using this method.

The invention claimed is:

1. A programming device comprising:
a group of program generation tools to generate programs for each of a plurality of devices forming part of a control system that controls a group of external machines; and
a data sharing unit adapted to interface with said group of program generation tools to share a variable name and attribute data definitions corresponding to an object of each of said plurality of devices,
wherein the objects are shared by said program generation tools for generating the programs by transferring the variable name and the attribute data definitions corresponding to the object into each respective program generation tool that shares the object and wherein the plurality of devices includes at least two devices selected from a group of: a display device displaying status of each of the machines, a system supervision device detecting an abnormal condition of a production line comprising the group of machines, and a programmable controller for controlling one or more of the machines,
wherein the programming device further comprises an object data definition unit adapted to perform data definition and data modification of the objects shared in the data sharing unit,
wherein objects involved in the object sharing are centrally managed,
wherein the data definition of the objects are provided in an object managing table, and
wherein the data sharing unit stores the object managing table.

2. The programming device according to claim 1, wherein programming action is one of the program generation tools relating to an object acts as a trigger to store a setting of the object to the data sharing unit together with an indication of the program generation tools which reference said object, and
the sharing of said object with program generation tools other than said one of the program generation tools comprises notifying the program generation tools, other than said one of the program generation tools which reference said object, of said object.

3. The programming device according to claim 1, further comprising:
a system configuration tool, being registered with a subset of said objects, said subset of said objects being basic type objects having a high frequency of use in the devices in the control system, the system configuration tool being adapted to select an object from the basic type objects for use in the control system.

4. The programming device according to claim 1, wherein the plurality of devices comprise:
the display device displaying the status of each of the machines;
the system supervision device detecting the abnormal condition of the production line comprising the group of machines; and
a programmable controller for controlling one or more of the machines.

5. The programming device according to claim 1, wherein the group of program generation tools comprises at least two out of a group of: a display program generation tool, a control program generation tool, a communication program generation tool, and a system supervision program generation tool and wherein the data sharing unit is adapted to download the same object name and the same object attributes to every program generation tool that shares the object and wherein, when the object name and the object attributes are downloaded into one of the program generation tools, access to the object name and the object attribute data is allowed for other program generation tools.

6. The programming device according to claim 5, wherein for each object of each of said plurality devices, the data sharing unit stores the available name, the attribute data definitions, and a list of devices, from the plurality of devices forming part of the control system, that refer to the object.

7. The programming device according to claim 6, wherein the object managing table comprises the variable name, the attribute data definitions, the list of devices, and an update status, for each object of each of said plurality devices, and wherein the update status indicates whether or not the corresponding object has been updated.

8. The programming device according to claim 7, wherein, when the corresponding object has been updated, the data sharing unit accesses the list of devices for the corresponding object and notifies the program generation tools for each of the devices on the list.

9. The programming device according to claim 1, wherein the generation tools comprise a tool for generating a computer program, the computer program comprising a control program, which allows the programmable controller control the operations of one or more of the machines and a display program, which allows the display device display operations of one or more of the machines, and wherein the data sharing unit causes the control program to create same variable name definitions and attribute data definitions for the object as the display program.

10. A programming device comprising a group of program generation tools for generating programs for each of a plurality of devices forming part of a control system that controls a group of machines,
- wherein one of the program generation tools performs data definition of a variable name and attribute data corresponding to an object in each of said devices forming part of the control system for controlling the group of machines, and
- wherein the variable name and attribute data corresponding to said object are stored or use by program generation tools other than said one of the program generation tools, and
- wherein the plurality of devices includes at least two devices selected from a group of: a display device displaying status of each of the machines, a system supervision device detecting an abnormal condition of a production line comprising the group of machines, and a programmable controller for controlling one or more of the machines,
- wherein the object is shared by said program generation tools for generating the programs by transferring the variable name and the attribute data definitions corresponding to the object into each respective program generation tool that shares the object using a data sharing unit,
- wherein the programming device further comprises an object data definition unit adapted to perform data definition and data modification of the objects shared in the data sharing unit,
- wherein objects involved in the object sharing are centrally managed,
- wherein the data definition of the objects are provided in an object managing table, and
- wherein the data sharing unit stores the object managing table.

11. The programming device according to claim 10, wherein information about whether or not the object is referenced by program generation tools other than said one of the program generation tools is registered, and
- wherein any program generation tools, other than said one of the program generation tools which reference the object, are notified of the object.

12. The programming device according to claim 11, further comprising a detection unit adapted to detect any overlap between a referenced part of the object and other stored objects when a program is generated by the program generation tools other than said one of the program generation tools.

13. The programming device according to claim 11, wherein when an object referenced by a first program generation tool from the group of program generation tools is changed by a second program generation tool from the group of program generation tools, the first program generation tool is notified of the changed object.

14. The programming device according to claim 11, wherein the object is stored to a storage area for subsequent retrieval by the other program generation tools which reference the object when they are started.

15. A programming method for generating programs for devices forming part of a control system that controls a group of machines, the method comprising:
- according to a pre-designed virtual object, defining an object name and attribute data corresponding to an object of each of the devices forming part of the control system to control the group of machines, specifying a device that will use the object, and registering information about the object and the specified device in a data sharing unit;
- notifying, of each object, a program generation tool for the specified device that will use the object; and
- according to the objects registered in the data sharing unit, performing programming of the devices by the notified program generation tools, and
- wherein the plurality of devices includes at least two devices selected from a group of: a display device displaying status of each of the machines, a system supervision device detecting an abnormal condition of a production line comprising the group of machines, and a programmable controller for controlling one or more of the machines,
- wherein the object is shared by said program generation tools for generating the programs by transferring the variable name and the attribute data definitions corresponding to the object into each respective program generation tool that shares the object using a data sharing unit,
- wherein the programming device further comprises an object data definition unit adapted to perform data definition and data modification of the objects shared in the data sharing unit,
- wherein objects involved in the object sharing are centrally managed,
- wherein the data definition of the objects are provided in an object managing table, and
- wherein the data sharing unit stores the object managing table.

16. The method according to claim 15, further comprising downloading a program generated by the program generation tool into a respective specified device for which the program was generated, wherein said defining on the object name and attribute data comprises creating the object name and assigning the attribute data that corresponds to the object, and wherein the created object name and the assigned attribute data is shared by a plurality of program generating tools, each of said plurality of program generating tools generates a respective program forming part of the control system.

* * * * *